United States Patent
Hofmann et al.

(12)

(10) Patent No.: US 11,571,857 B2
(45) Date of Patent: Feb. 7, 2023

(54) APPARATUS FOR ADDITIVELY MANUFACTURING OF THREE-DIMENSIONAL OBJECTS

(71) Applicant: CONCEPT LASER GMBH, Lichtenfels (DE)

(72) Inventors: Alexander Hofmann, Weismain (DE); Daniel Winiarski, Bad Staffelstein (DE)

(73) Assignee: CONCEPT LASER GMBH, Lichtenfels (DE)

( * ) Notice: Subject to any disclaimer, the term of this patent is extended or adjusted under 35 U.S.C. 154(b) by 867 days.

(21) Appl. No.: 16/162,244

(22) Filed: Oct. 16, 2018

(65) Prior Publication Data

US 2019/0176402 A1    Jun. 13, 2019

(30) Foreign Application Priority Data

Dec. 7, 2017  (EP) .................................... 17205989

(51) Int. Cl.
 *B29C 64/35*  (2017.01)
 *B33Y 10/00*  (2015.01)
 (Continued)

(52) U.S. Cl.
 CPC .............. *B29C 64/35* (2017.08); *B22F 12/00* (2021.01); *B29C 64/153* (2017.08);
 (Continued)

(58) Field of Classification Search
 CPC ..... B29C 64/35; B29C 64/153; B29C 64/245; B29C 64/30; B29C 64/25; B29C 64/371;
 (Continued)

(56) References Cited

U.S. PATENT DOCUMENTS

2002/0090410 A1  7/2002  Tochimoto et al.
2013/0052291 A1*  2/2013  Morikawa ............... B29C 64/35
                                                     425/135
(Continued)

FOREIGN PATENT DOCUMENTS

DE       20122294 U1   3/2005
EP        1316408 A1   6/2003
(Continued)

OTHER PUBLICATIONS

European Search Opinion Corresponding to Application No. 17205989 dated Jun. 13, 2018.
(Continued)

*Primary Examiner* — Joseph S Del Sole
*Assistant Examiner* — John Robitaille
(74) *Attorney, Agent, or Firm* — Dority & Manning, P.A.

(57) ABSTRACT

Apparatus (1) for additively manufacturing of three-dimensional objects (2) by means of successive layerwise selective consolidation of layers of a build material, comprising a build material removal device (3) with at least one build material removal unit (4) adapted to remove non-consolidated build material (5) surrounding an additively built object (2), wherein the build material removal device (3) comprises a build material removal chamber (6) delimiting a build material removal volume (7), wherein the build material removal chamber (6) is arranged or arrangeable above the object (2), wherein the object (2) is successively moveable into the build material removal chamber (6), wherein the at least one build material removal unit (4) is adapted to remove non-consolidated build material (5).

20 Claims, 4 Drawing Sheets

(51) Int. Cl.
  *B29C 64/153* (2017.01)
  *B33Y 30/00* (2015.01)
  *B33Y 40/00* (2020.01)
  *B29C 64/245* (2017.01)
  *B29C 64/30* (2017.01)
  *B29C 64/25* (2017.01)
  *B22F 12/00* (2021.01)
  *B33Y 40/20* (2020.01)
  *B29C 64/371* (2017.01)
  *B22F 10/10* (2021.01)

(52) U.S. Cl.
  CPC ............ *B29C 64/245* (2017.08); *B29C 64/25* (2017.08); *B29C 64/30* (2017.08); *B29C 64/371* (2017.08); *B33Y 10/00* (2014.12); *B33Y 30/00* (2014.12); *B33Y 40/00* (2014.12); *B33Y 40/20* (2020.01); *B22F 10/10* (2021.01)

(58) Field of Classification Search
  CPC ......... B33Y 10/00; B33Y 30/00; B33Y 40/00; B22F 12/00
  See application file for complete search history.

(56) References Cited

U.S. PATENT DOCUMENTS

| | | |
|---|---|---|
| 2016/0101469 A1 | 4/2016 | Kawada et al. |
| 2016/0236422 A1 | 8/2016 | Sakura |
| 2016/0243618 A1* | 8/2016 | Heugel ................ B29C 64/153 |
| 2018/0133967 A1 | 5/2018 | Bechmann et al. |

FOREIGN PATENT DOCUMENTS

| | | |
|---|---|---|
| JP | 2016074957 A | 5/2016 |
| JP | 2018080390 A | 5/2018 |

OTHER PUBLICATIONS

European Search Report Corresponding to Application No. 17205989 dated Jun. 13, 2018.
Machine Translated Japanese Office Action Corresponding to Application No. 2018130635 dated Jan. 21, 2019.
Combined Chinese Search Report and Office Action Corresponding to Application No. 201810039604 dated Jul. 31, 2020.

* cited by examiner

APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 205 989.1 filed Dec. 7, 2017, the contents of which is incorporated herein by reference in its entirety as if set forth verbatim.

The invention relates to an apparatus for additively manufacturing of three-dimensional objects by means of successive layerwise selective consolidation of layers of a build material, comprising a build material removal device with at least one build material removal unit adapted to remove non-consolidated build material surrounding an additively built object.

Such apparatuses for additively manufacturing of three-dimensional objects are generally known from prior art, wherein a build material removal device is provided comprising at least one build material removal unit. The build material removal unit is used to remove non-consolidated build material that surrounds one or more objects that are additively built via the apparatus. To additively build the three-dimensional object (powdery) build material is selectively layerwise consolidated, wherein a so-called "powder bed" is generated, i.e. a volume of non-consolidated build material surrounding the object. Of course, the term "surrounding" does not only refer to build material that is arranged around the additively built object, but the term surrounding refers to non-consolidated build material independent of the position of the non-consolidated build material, wherein the non-consolidated build material has to be removed after the manufacturing process after the object is finished. In other words, the term surrounding may also refer to build material that is at least partially arranged inside a contour of the object or adhered to an arbitrary surface of the object.

To remove non-consolidated build material from the object build material removal units or build material removal devices are known, wherein for example non-consolidated build material may be removed manually via a suction device, in particular a suction lance. Dependent on the object geometry and the volume of non-consolidated build material that has to be removed from the object, the procedure of removing the non-consolidated build material is time and work consuming. Further, in build material removal devices in which a large volume, e.g. the whole powder bed, is simultaneously affected with a common suction stream, the efficiency of the build material removal device is negatively affected, since the flow rate of the suction stream is distributed on the whole powder bed and will therefore decrease.

It is an object to provide an apparatus for additively manufacturing of three-dimensional objects, wherein the efficiency in removing non-consolidated build material from an additively built object is increased.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the build material removal device is used to remove non-consolidated build material from an additively built object, in other words the build material removal device is used to "clean" the additively built object. The term "non-consolidated build material" refers to build material that is not consolidated on purpose to form at least one section or part of the additively built object. Besides, partially consolidated build material that is not consolidated on purpose to form at least one section of the additively built object, in particular conglomerates of build material particles, such as build material splashes or other undesired conglomerates of build material particles, are also referred to as "non-consolidated build material" in the scope of this application.

The invention is based on the idea that the build material removal device comprises a build material removal chamber delimiting a build material removal volume, wherein the build material removal chamber is arranged or arrangeable above the object, wherein the object is successively movable into the build material removal chamber, wherein the at least one build material removal unit is adapted to remove non-consolidated build material.

According to the invention, the additively built object can be successively moved into the build material removal chamber that is provided via the build material removal device. The term "successive movement" or the object being "successively movable" refers to any movement in which the object is not completely inserted into the removal chamber but wherein the object is successively moved, e.g. stepwise or in a continuous movement, into the removal chamber. In other words, non-consolidated build material can already be removed with the inventive build material removal device while the object is successively moved into the build material removal chamber.

Thus, a removal position may be defined, in which the object is at least partially arranged inside the build material removal chamber, wherein the non-consolidated build material surrounding the object is removed as the corresponding section of the object (and the surrounding non-consolidated build material) is inserted into the build material removal chamber. Therefore, only a defined part of the build material removal volume is filled with non-consolidated build material surrounding the additively built object at the same time, wherein a generated build material removal stream, for example a stream of process gas, can be charged with the non-consolidated build material and a defined flow rate can be upheld, as only a defined part of the build material removal chamber is filled with non-consolidated build material. Instead of inserting the additively built object completely into the build material removal chamber and thereby reducing the flow rate significantly, the object that is positioned in the removal position is at least partially arranged inside the build material removal chamber or moved successively into the build material removal chamber, respectively.

Due to the partial arrangement inside the build material removal chamber, only a part of the non-consolidated build material is inserted in the build material removal chamber at the same time. The volume of non-consolidated build material that has to be conveyed out of the build material removal chamber is restricted to the part of the volume of build material that is already inserted in the build material removal chamber. Thus, the non-consolidated build material the corresponding stream is charged with is lower compared with inserting the entire object (and the entire powder bed) into the build material removal chamber at the same time. Thus, the efficiency in conveying build material out of the build material removal chamber is increased. By moving the object successively into the build material removal chamber the build material removal unit can be used more efficiently.

According to a first preferred embodiment of the inventive apparatus, a moving unit may be provided, in particular a carrying unit carrying the powder bed, adapted to generate a movement of the powder bed relative to the build material removal chamber, wherein due to the movement the moving unit is adapted to successively move the powder bed into the build material removal chamber, in particular against a build direction, preferably from below, wherein build material is continuously removable via the at least one build material removal unit with the powder bed at least partially inside the build material removal chamber.

Thus, a moving unit may be provided that is adapted to move the powder bed relative to the build material removal chamber, in particular adapted to insert the powder bed successively into the build material removal chamber. The term "powder bed" refers to the volume of build material that is arranged, for example in a build module, wherein the object is additively built inside the powder bed. The powder bed is generated by successively layerwise applying build material and selectively consolidating, e.g. via irradiation, build material arranged in the corresponding layers. Thus, build material that remains unconsolidated, so-called "non-consolidated build material" is arranged next to the additively built object, i.e. surrounds the additively built object.

Accordingly, after the additive manufacturing process is finished, the non-consolidated build material has to be removed from the additively built object. Therefore, the powder bed is successively moved into the build material removal chamber, preferably from below. Due to the successive movement of the powder bed into the build material removal chamber, the non-consolidated build material surrounding the object may be continuously removed as the non-consolidated build material is successively inserted into the build material removal chamber. In other words, only a defined part of the powder bed is inserted into the build material removal chamber, wherein non-consolidated build material is continuously removed, wherein preferably the rate of moving the powder bed into the build material removal chamber corresponds to a defined value relating to the ability of the build material removal stream, e.g. the flow rate, to convey build material out of the build material removal chamber.

The powder bed may be carried by a carrying unit, for example a powder table or a build plate, that can be moved relative to the build material removal chamber. The carrying unit or an entire build module comprising a build chamber, in which the powder bed is arranged during the manufacturing process, does not have to be considered as part of the build material removal device. Instead, a corresponding build module may be coupled with the build material removal device to remove the non-consolidated build material from the additively built object.

According to another preferred embodiment of the inventive apparatus, the build material removal volume may, preferably automatically, be adjustable, in particular via an expansion or a reduction of the build material removal chamber.

Thus, the size of the build material removal volume can be adjusted, wherein the size of the build material removal volume may in particular be expanded or reduced upon an expansion or a reduction of the build material removal chamber. By having the size of the build material removal volume adjusted, an efficiency of the removal of non-consolidated build material inside the build material removal chamber can further be increased.

The size of at least one wall portion of the build material removal chamber may in particular be adjustable, in particular expandable or reducible, to adjust the size of the build material removal volume. As the build material removal chamber delimits the build material removal volume an adjustment to the size or the dimensions of the wall portions of the build material removal chamber results in an adjustment of the build material removal volume.

To adjust the at least one wall portion, in particular the size of at least one wall portion of the build material removal chamber, the at least one wall portion of the build material removal chamber may comprise a telescopic portion, in particular a bellows. Thus, the at least one wall portion of the build material removal chamber may be telescoped or extended or reduced.

As described before, the build material removal device may be integrated in an apparatus for additively manufacturing of three-dimensional objects or may be considered as a separate device separably connected or connectable to an apparatus for additively manufacturing three-dimensional objects. A corresponding apparatus for additively manufacturing of three-dimensional objects may be a module, in particular a powder module, such as a dose module or a build module or modules provided for post-processing of additively built objects, such as handling stations, in particular such as a glovebox. The build material removal device may further be considered as a separate device, which can be coupled with such an apparatus, for example connected to the top of a powder module, in particular a build module.

With the build material removal device integrated in an apparatus for additively manufacturing of three-dimensional objects, the build material removal device may be arranged or arrangeable inside a process chamber of the apparatus or on top of an opening for a powder module. In either case, an additively built object, in particular together with the powder bed surrounding the additively built object, may be moved into the build material removal chamber that is arranged above the additively built object.

Thus, the build module that provides the powder bed in which the object is additively built may be connected with the build material removal device after the additive manufacturing process is finished. To connect the powder module with the build material removal device, the powder module may be removed from the apparatus in which the actual manufacturing process takes place and the powder module may be inserted into an apparatus for additively manufacturing three-dimensional objects in which the post-processing, in particular the cleaning of the additively built objects is performed. Alternatively, the apparatus in which the actual manufacturing process takes place may comprise a build material removal device that can be attached to or connected with the powder module inserted inside the apparatus for additively manufacturing three-dimensional objects to remove the non-consolidated build material surrounding the additively built object.

The build material removal device integrated into such an apparatus may be moved to a parking position while the additive manufacturing process is performed and may be moved from the parking position into a removal position in which the build material removal device is positioned above the additively built object. The additively built object may then be inserted into the build material removal chamber from below, wherein non-consolidated build material may successively be removed from the powder bed as it is successively inserted into the build material removal chamber.

According to another preferred embodiment of the apparatus, a shape and/or a cross-section of the build material removal chamber may be adjusted and/or defined dependent on a parameter relating to an object geometry, in particular the shape and/or the cross-section may be cylindrical or triangular or rectangular. In particular, regarding the manufacturing of three-dimensional objects on large-scale, in particular large quantities of objects, the shape and/or the cross-section of the build material removal chamber may be adapted to the additively manufactured objects. This allows ensuring that the removal of non-consolidated build material surrounding the additively built object can further be improved, as the shape of the build material removal chamber is fit or adjusted to the shape and/or the cross section of the additively built object.

Thus, the build material removal stream generated to convey the non-consolidated build material can stream through the build material removal chamber adjusted to the object geometry. Therefore, at least one a streaming property of a build material removal stream provided for conveying the non-consolidated build material out of the build material removal chamber may be defined or adjusted dependent on the object geometry based on the shape and/or the cross-section of the build material removal chamber.

The build material removal device may accordingly be adapted to generate at least one build material removal stream, preferably a stream of process gas. A corresponding stream of process gas may be adapted to be charged with non-consolidated build material inside the build material removal volume. The build material removal unit may therefore, be adapted to generate at least one suction stream and/or at least one of pressure stream. Thus, a build material removal stream may be generated that streams into the build material removal chamber and/or out of the build material removal chamber. Alternatively, a build material removal unit may be coupled with a separate stream generating device that is adapted to generate a corresponding build material removal stream.

The build material removal device, e.g. at least one build material removal unit, may further be adapted to generate at least one primary build material removal stream that may be adapted to convey non-consolidated build material towards and/or alongside at least one wall portion of at least one build material removal chamber wall. Advantageously, the at least one primary build material removal stream can be used to convey non-consolidated build material towards at least one build material removal chamber wall. The same primary build material removal stream or another primary build material removal stream may accordingly be used to convey build material alongside at least one wall portion of at least one build material removal chamber wall. Preferably, a cyclone streaming pattern of the primary build material removal stream is generated, wherein the primary build material removal stream streams radially towards the build material removal chamber wall, wherein build material is helically or spirally conveyed along the inner build material removal chamber wall, preferably towards at least one stream exhaust.

The at least one stream exhaust may also extend at least partially alongside at least one wall portion of the at least one build material removal chamber wall, in particular extending circumferentially around at least one section of the build material removal chamber. Thus, non-consolidated build material that is conveyed via the build material removal stream can be guided along the inner build material removal chamber wall towards the at least one stream exhaust that extends (at least partially) circumferentially around the build material removal chamber wall and is adapted to receive the non-consolidated build material conveyed via the build material removal stream. The non-consolidated build material conveyed via the build material removal stream may therefore, exit the build material removal chamber via the at least one stream exhaust. Further, multiple stream exhaust may be provided that are, for example arranged in different positions (in z-direction or in a circumferential direction) along the build material removal chamber wall. At least one stream exhaust may be arranged tangentially with respect to the build material chamber wall.

It is also possible to provide a common suction channel, e.g. in a bottom portion of the build material chamber, wherein non-consolidated build material is guided into the common suction channel from where it is conveyed into the at least one stream exhaust.

The build material removal device may further be adapted to generate at least one secondary build material removal stream, preferably of process gas, into and/or out of the build material removal chamber, wherein the at least one secondary build material removal stream is guided via at least one opening, in particular a nozzle, into and/or out of the build material removal chamber. Therefore, several secondary build material removal streams may be guided into the build material removal chamber to provide secondary build material removal streams to remove and/or convey build material and to "clean" the object. The respective openings may, for example, be used to equalize the pressure inside the build material removal chamber, in particular if the build material removal chamber is arranged inside an apparatus for additively manufacturing of three-dimensional objects in which the additive manufacturing process takes place. Thus, process gas inside the process chamber, i.e. surrounding the build material removal chamber, may stream through the at least one opening into the build material removal chamber. Thus, a negative pressure generated by a corresponding stream generating device can be compensated.

Further, a position and/or a direction and/or a geometry of the at least one opening and/or a streaming parameter of the at least one secondary build material removal stream through the at least one opening is defined dependent on at least one parameter relating to an object geometry of the additively built object. Therefore, various parameters of the at least one secondary build material removal stream may be changed dependent on at least one parameter that relates to an object geometry of the additively built object. Generally, at least one secondary build material removal stream may be adjusted to remove build material dependent on the geometry, in particular the shape of the additively built object. In other words, the at least one secondary build material removal stream may be generated in that non-consolidated build material surrounding the additively built object or adhering to the additively built object may be removed taking into calculation the specific characteristics resulting from the actual geometry of the additively built object.

For example, a position and a direction of the at least one opening may be chosen in that build material sticking to the additively built object due to the concrete shape of the additively built object may be removed in an improved manner. Further at least one a streaming parameter, such as a flow rate may be adjusted dependent on the need for removing build material in a specific section of the additively built object. Additionally, pressure pulses may be generated to remove non-consolidated build material adhered to the additively built object. Of course, the corresponding parameters, in particular the direction and/or the streaming parameters may be varied or may be predefined.

According to another embodiment of the apparatus, the at least one secondary build material removal stream is moveable, in particular via a swivel movement, relative to a powder bed and/or to the object, preferably via a movement of the build plate and/or a movement of the at least one opening. Due to the movement, in particular the swivel movement, of the secondary build material removal stream relative to the object (or relative to the powder bed, respectively) the removal of material sticking to the object can be improved. In particular by varying the direction of the at least one secondary build material removal stream, the at least one secondary build material removal stream may be guided over the surface of the additively built object to remove the build material adhered to the surface.

Besides, the invention relates to an build material removal device for an apparatus for additively manufacturing of three-dimensional objects, in particular for an inventive apparatus as described before, which build material removal device comprises a build material removal chamber delimiting a build material removal volume, wherein the build material removal chamber is arranged or arrangeable above the object, wherein the object is successively moveable into the build material removal chamber, wherein the at least one build material removal unit is adapted to remove non-consolidated build material.

Additionally, the invention relates to a method for operating at least one build material removal device for an apparatus for additively manufacturing three-dimensional objects by means of successive layerwise selective consolidation of layers of a build material, in particular an inventive apparatus, as described before, wherein a build material removal chamber delimiting a build material removal volume is arranged above the object, wherein non-consolidated build material is removed with the object being successively moved into the build material removal chamber.

Of course, all details, features and advantages described with respect to the inventive apparatus are fully transferable to the inventive build material removal device and the inventive method.

Exemplary embodiments of the invention are described with reference to the Fig. The Fig. are schematic diagrams, wherein FIG. 1 shows an inventive apparatus according to a first embodiment;

Figure 1:
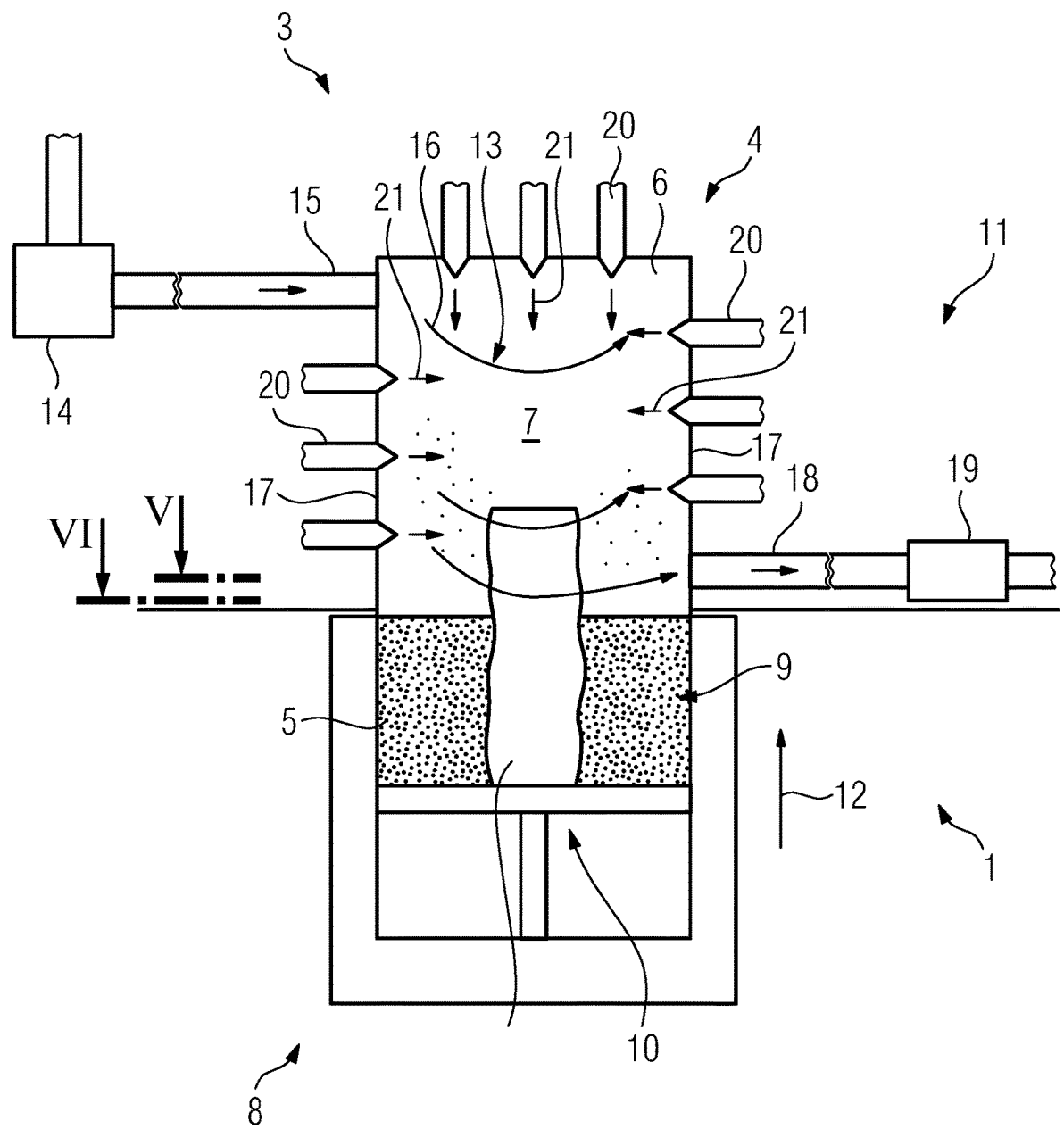
Figure 5:
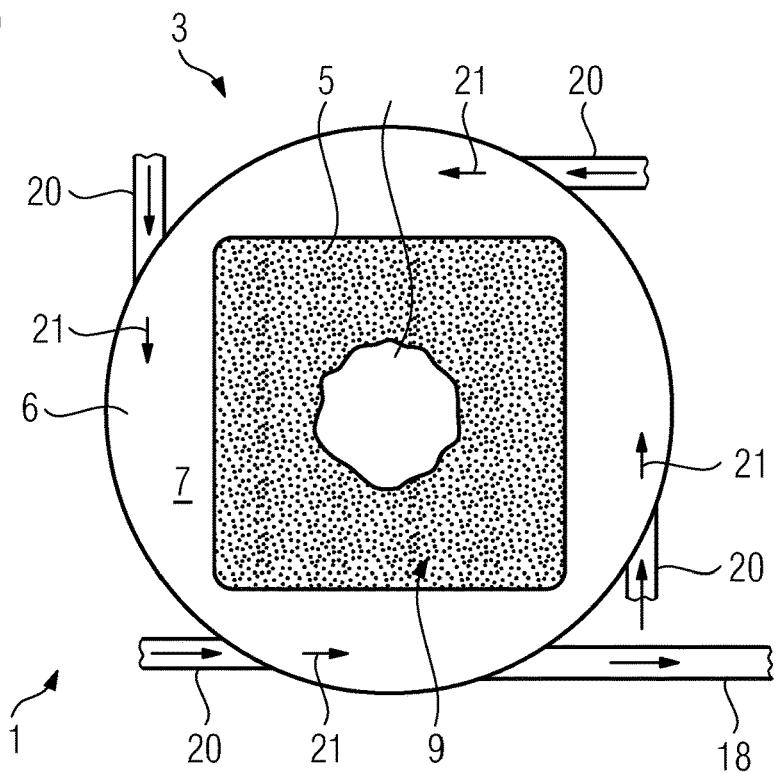
Figure 6:
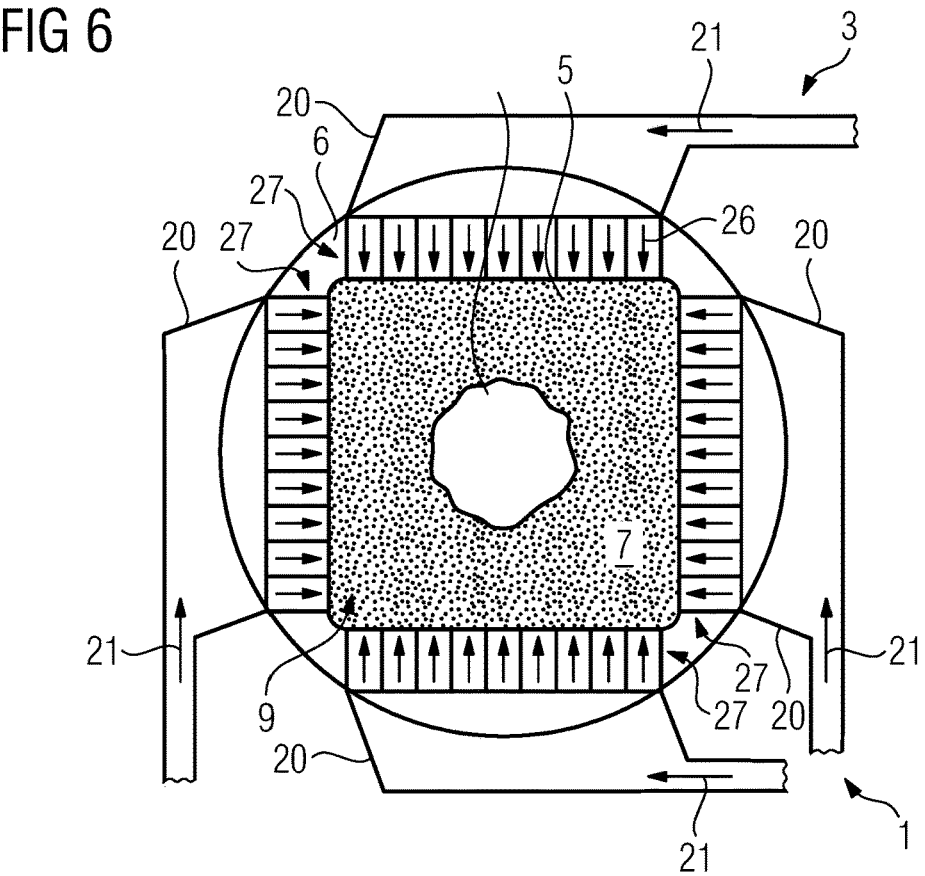

FIG. 5 shows an inventive build material removal device according to a third embodiment; and FIG. 6 shows an inventive build material removal device according to a fourth embodiment FIG. 1 shows an inventive apparatus 1 for additively manufacturing of three-dimensional objects 2 by means of successive layerwise selective consolidation of layers of a build material. The apparatus 1 comprises a build material removal device 3, which build material removal device 3 comprises a build material removal unit 4 that is adapted to remove non-consolidated build material 5 surrounding the additively built object 2.

The build material removal device 3 comprises a build material removal chamber 6 that delimits a build material removal volume 7. In other words, a build material removal volume 7 is enclosed by the build material removal chamber 6. As can further be derived from FIG. 1, the build material removal chamber 6 is arranged above the object 2 or a powder module 8 is arranged below the build material removal unit 4, respectively.

Thus, to remove non-consolidated build material 5 from a powder bed 9, i.e. a volume of build material the object 2 is additively built in, wherein due to the selective consolidation of layers of build material, build material only is consolidated in regions corresponding to the cross-section of the object 2. Therefore, build material that is not consolidated surrounds the object 2. The powder bed 9 comprises the additively built object 2 and non-consolidated build material 5 surrounding the object 2. The powder bed 9 is carried via a carrying unit 10 provided by the powder module 8.

The powder module 8 can be attached to or connected with the build material removal device 3 after the additive manufacturing process of the additively built object 2 is finished. For example, the powder module 8 may essentially be held in place after the additively manufacturing process is finished and the build material removal device 3 that may be integrated in the apparatus 1, in particular in a process chamber 11 of the apparatus 1, may be moved from a parking position (not shown) to the position as depicted in FIG. 1. Subsequently, the powder bed 9 or the non-consolidated build material 5 and the object 2 that is surrounded by the non-consolidated build material 5 may be moved successively into the build material removal chamber 6 as indicated with arrow 12.

Alternatively, the build material removal device 3 can form a separate apparatus to which the powder module 8 can be connected after the manufacturing process of the additively built object 2 is finished. Thus, the powder module 8 can, for example, exit the apparatus in which the object 2 has been additively built and can be moved to the build material removal device 3. After a connection between the powder module 8 and the build material removal chamber 6 has been established, the opening through which the powder bed 9 can be moved into the build material removal chamber 6 can be opened, for example via a sliding door.

The movement of the powder bed 9 in the direction of arrow 12 can be defined as against the "build direction", as the object 2 is additively built by successively consolidating of layers of build material, wherein the carrying unit 10 is used to lower the powder bed 9 as new layers of build material are consolidated or applied onto the build plane (uppermost layer of build material facing the process chamber 11). As the object 2 is successively moved into the build material removal chamber 6, e.g. in a continuous movement or moved in steps, non-consolidated build material 5 can be conveyed via a build material removal stream 13. The build material removal stream 13 is preferably a stream of process gas, in particular an inert gas, such as argon. The build material removal stream 13 can be charged or loaded with build material particles or non-consolidated build material 5, respectively, and therefore, non-consolidated build material 5 can be removed from the powder bed 9 and conveyed out of the build material removal volume 7 via the build material removal stream 13.

The build material removal stream 13 is generated by a stream generating unit 14 assigned to the build material removal unit 4. The build material removal stream 13 generated by the stream generating unit 14 is fed into the build material removal chamber 6 via a stream intake 15. Inside the build material removal chamber 6 the build material removal stream 13, in particular a primary build material removal stream 16 that can be considered as sub-part of the build material removal stream 13 is guided in that non-consolidated build material 5 is conveyed radially towards an inner build material removal chamber wall 17 of the build material removal chamber 6 and guided towards the bottom of the build material removal chamber 6.

In the region of the bottom of the build material removal chamber 6 a stream exhaust 18 is arranged through which the build material removal stream 13 can exit the build material removal chamber 6. In other words, the primary build material removal stream 16 is generated in that it enters the build material removal chamber 6 through the stream intake 15, wherein the primary build material removal stream 16 is guided in a cyclone-like movement or as a cyclone stream inside the build material removal chamber 6. Non-consolidated build material 5 the primary build material removal stream 16 is charged with is guided helically or spirally along the inner wall 17 of the build material removal chamber 6 and guided towards the stream exhaust 18.

After the build material removal stream 13 streams through the stream exhaust 18, the build material removal stream 13 can be fed into a filter device 19 adapted to separate non-consolidated build material 5 from the build material removal stream 13. Afterwards, the build material removal stream 13 can be fed to the stream generating unit 14 in that a closed process gas cycle can be achieved.

FIG. 1 further shows that the build material removal chamber 6 comprises multiple openings 20, for example built as nozzles. Secondary build material removal streams 21 can also be generated via the stream generating device 14 and fed to the openings 20. The secondary build material removal streams 21 can enter the build material removal chamber 6 through the openings 20 and can therefore, be used to remove non-consolidated build material 5 adhered to the object 2. Non-consolidated build material 5 that has been removed from the surface of the object 2 can afterwards be removed from the build material removal volume 7 via the build material removal stream 13. In other words, the build material removal stream 13 comprises a primary build material removal stream 16 that in general, performs a cyclone-like movement of build material inside the build material removal chamber 6 and multiple secondary build material removal streams 21 that are essentially guided towards the surface of the object 2.

As described before, the object 2 and the non-consolidated build material 5 surrounding the object 2, i.e. the powder bed 9, is successively inserted into the build material removal chamber 6. Due to the successive insertion of the powder bed 9, only a small a volume of non-consolidated build material 5 is inserted into the build material removal chamber 6 (compared with a complete insertion of the whole powder bed 9 into the build material removal chamber 6 at the same time). Thus, only a defined volume of non-consolidated build material 5 is present in the build material removal chamber 6 at a defined point of time. Therefore, the build material removal stream 13 can be charged with essentially all non-consolidated build material 5 and can convey the non-consolidated build material 5 towards the stream exhaust 18 and out of the build material removal chamber 6. The generated build material removal stream 13 can therefore, be used more efficiently compared with removing non-consolidated build material 5 by completely inserting the whole powder bed 9 into the build material removal chamber 6.

The build material removal chamber 6, in particular the shape and/or the cross-section of the build material removal chamber 6 is adapted to the shape and the cross-sections of the object 2, wherein in particular the position of the openings 20 and the streaming path the build material removal stream 13, in particular the primary build material removal stream 16 and the secondary build material removal streams 21 are guided along, are adjusted and defined dependent on the object geometry of the additively built object 2. Thus, build material, in particular non-consolidated build material 5 adhered to the surface of the object 2 can be removed from the powder bed 9 more efficiently.

Figure 2:
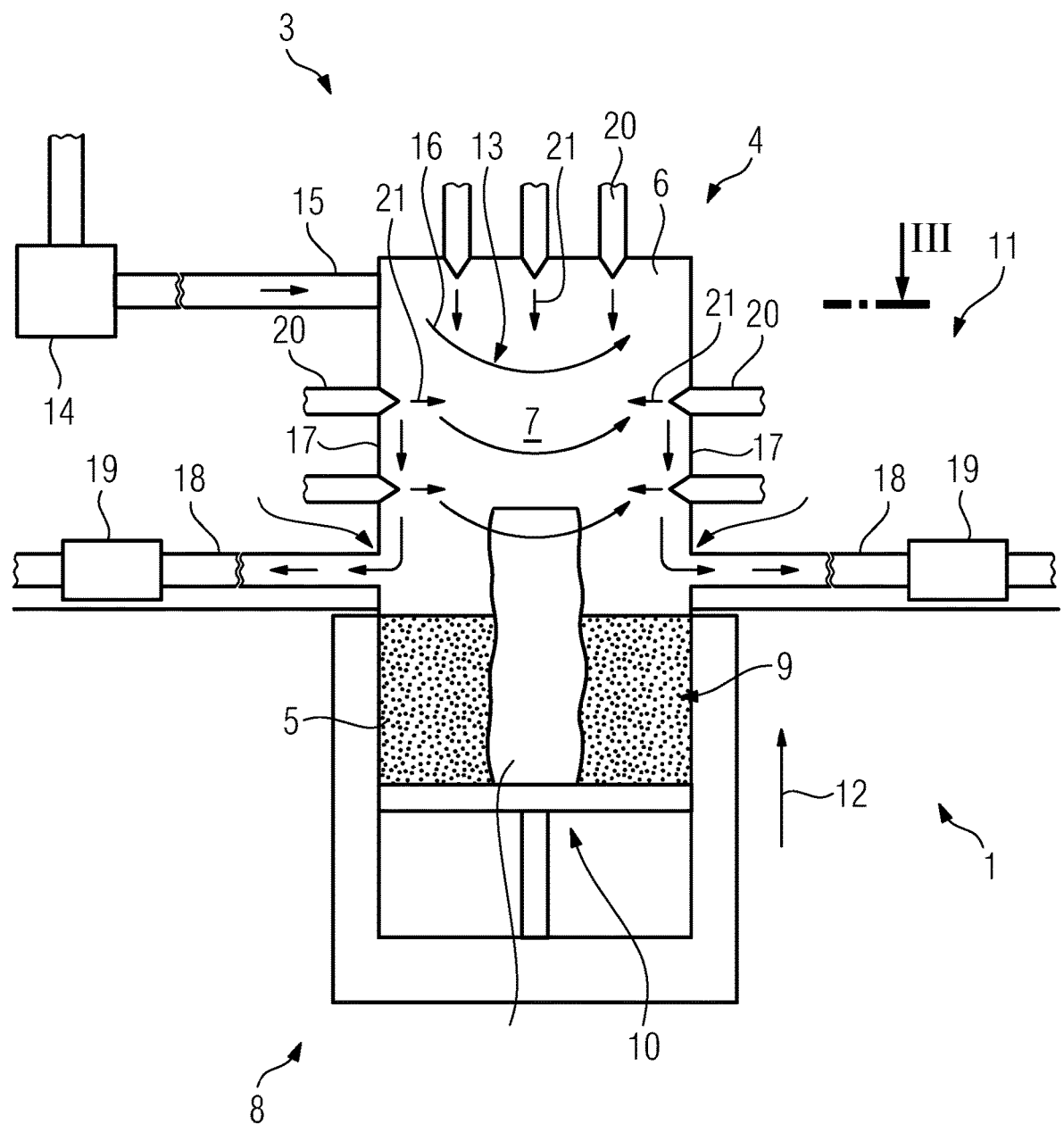
FIG. 2 shows an inventive apparatus according to a second embodiment.

FIG. 2 shows an apparatus 1 for additively manufacturing of three-dimensional objects 2 according to a second embodiment. As the general set up of the apparatus 1 as depicted in the FIGS. 1 and 2 is analogous, the same reference signs are used for the same parts. The apparatus 1, as depicted in FIG. 2, additionally comprises a common suction channel 22 that circumferentially extends around a bottom portion of the build material removal chamber 6. Thus, non-consolidated build material 5 that is conveyed along the inner walls 17 of the build material removal chamber 6 is guided towards the common suction channel 22 and can enter the common suction channel 22 at any point along the circumference of the build material removal chamber 6. Thus, the build material removal stream 13 can exit the build material removal chamber 6 through the common suction channel 22 from where it is fed into one or more stream exhausts 18. Again, the build material removal stream 13 can be fed through the stream exhausts 18 to the filter device 19.

Figure 3:
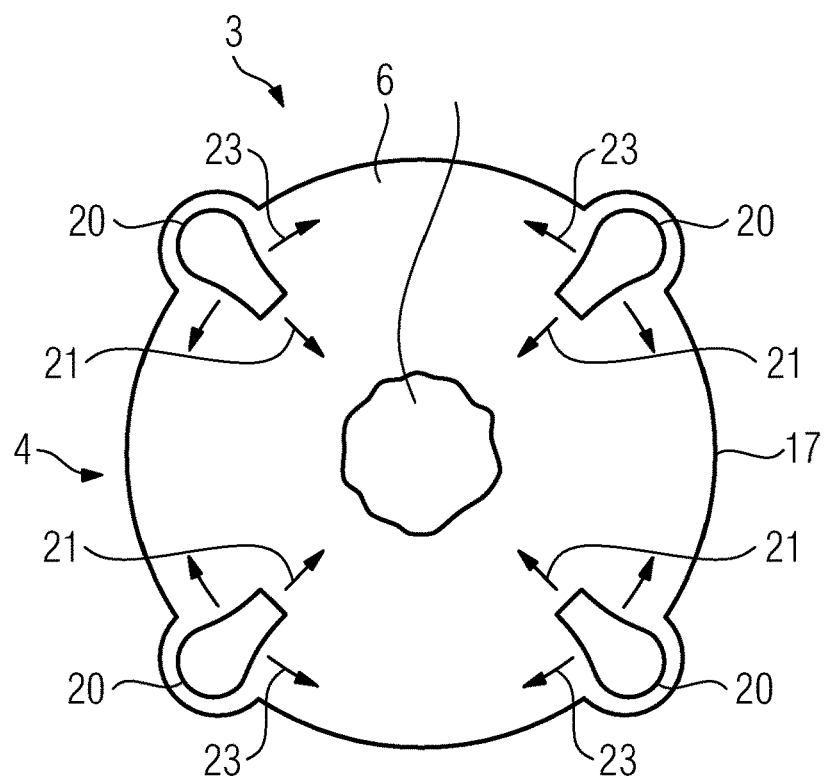
FIG. 3 shows an inventive build material removal device according to a first embodiment.

FIG. 3 shows a cross-sectional view of a build material removal device 3 according to a first embodiment from above the powder bed 9, for example one of the build material removal devices 3, as shown in the FIG. 1, 2. Again, the same reference signs are used for the same parts. For the sake of simplicity, the connections of the openings 20 with the stream generating device 14, as well as the primary build material removal stream 16 is not depicted in FIG. 3. As can be derived from FIG. 3, the openings 20, in particular nozzles, are adapted to generate the secondary build material removal streams 21 in that they are directed onto a surface of the object 2.

To further improve the removal of non-consolidated build material 5 from the object 2, the openings 20, in particular nozzles, can be moved, for example in a swivel movement, as indicated by arrows 23. Thus, the angle under which the secondary build material removal streams 21 are guided onto the object 2 to remove and/or pick up build material adhered to the surface of the object 2, can be changed to enlarge the area that can be affected with one opening 20. Of course, the depicted movement (arrow 23) is only exemplary, wherein the openings 20 can be moved in an arbitrary manner, for example up and down, left and right, or rotated about an axis. Further, the streaming parameters, such as the flow rate or the pressure under which the secondary build material removal streams 21 are fed into the build material removal chamber 6 can be adjusted. In particular, pressure pulses can be generated to remove non-consolidated build material 5 from the object 2.

Figure 4:
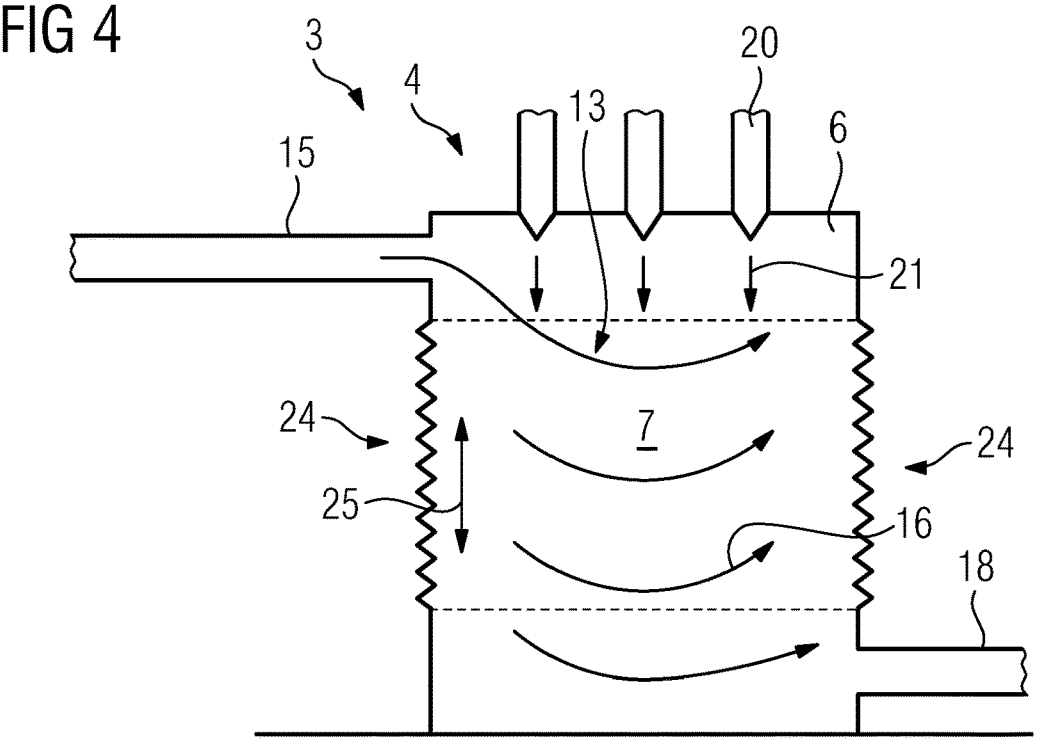
FIG. 4 shows an inventive build material removal device according to a second embodiment.

FIG. 4 shows an inventive build material removal device 3 with a build material removal unit 4 according to a second embodiment. As the general set up of the build material removal device 3 as depicted in FIG. 4 is analogous to the build material removal device 3 depicted in the FIGS. 1 to 3, the same numerals are used for the same parts. As can be derived from FIG. 4, the size of the build material removal chamber 6 of the build material removal device 3 can be adjusted. In other words, the build material removal volume 7 delimited by the build material removal chamber 6 can be expanded or reduced, for example dependent on the object position of the object 2, in particular dependent on how far the object 2 is inserted into the build material removal chamber 6. Thus, the build material removal volume 7 in which the build material removal stream 13 is guided or through which the build material removal stream 13 streams from the stream intake 15 to the stream exhaust 18, can be kept as small as possible to use the build material removal stream 13 as efficiently as possible.

To allow for an expansion or a reduction of the build material removal chamber 6, the build material removal chamber 6 comprises wall portions 24 that are telescopic, e.g. the build material removal chamber 6 comprises a section that is built telescopic, in particular as a bellows. Of course, the telescopic wall portions 24 can be arranged in an arbitrary position, for example between two openings 20. Therefore, the size of the build material removal chamber 6 can be enlarged corresponding to the position of the object 2. In particular, the build material removal chamber 6 can "grow" with the object 2 being successively inserted into the build material removal chamber 6. To expand the build material removal chamber 6 the telescopic wall portions 24 can be telescoped (as indicated with arrow 25). Of course, after the object 2 is being removed from the build material removal chamber 6 after the build material removal process is finished, the telescopic wall portions 24 can again be folded together to reduce the size of the build material removal chamber 6.

FIG. 5 shows a top view onto the powder bed 9 of the inventive apparatus 1 as indicated in FIG. 1. The apparatus 1, in particular the build material removal device 3 of the apparatus 1, comprises four openings 20 that are arranged in that secondary build material removal streams 21 are induced essentially tangentially into the build material removal chamber 6. Thus, non-consolidated build material 5 surrounding the additively built object 2 can be removed from the powder bed 9 via the secondary build material removal streams 21. As can further be derived from FIG. 5, as the secondary build material removal streams 21 are introduced essentially tangentially with respect to the build material removal chamber 6, a cyclone movement of the build material removal streams 21 is induced, wherein non-consolidated build material 5 removed from the powder bed 9 is conveyed towards the stream exhaust 18 and thereby removed from the build material removal chamber 6, as described before.

FIG. 6 shows another exemplary embodiment of a build material removal device 3, in particular a cross-sectional top view of a lower portion as indicated in FIG. 1. The build material removal device 3 comprises again, in particular additionally, four openings 20 that induce secondary build material removal streams 21 into the build material removal chamber 6. The openings 20 comprise stream guiding elements 27 that split up the secondary build material removal streams 21 into a large number of sub-streams 26. Thus, non-consolidated build material 5 can be stirred up on purpose to convey the non-consolidated build material 5 out of the build material removal chamber 6. In particular, the stirred up non-consolidated build material 5 is lead towards the stream exhaust 18 via the build material removal stream 13 that can be charged with the non-consolidated build material 5, as described before.

Self-evidently, all details, features and advantages described with respect to the individual Fig. and the individual embodiments can be combined, are fully transferable and exchangeable. The inventive method can be performed on the inventive apparatus.

The invention claimed is:

1. An apparatus for additively manufacturing at least one three-dimensional object, the apparatus comprising:
   a process chamber;
   an irradiation device adapted to selectively irradiate a build material layer disposed in the process chamber to form the at least one three-dimensional object; and
   a build material removal device comprising:
      at least one build material removal unit adapted to remove a build material removal volume of non-consolidated build material surrounding the at least one three-dimensional object; and,
      a build material removal chamber delimiting the build material removal volume, wherein the build material removal chamber is arranged or arrangeable above the at least one three-dimensional object such that the at least one three-dimensional object is configured to successively move into the build material removal chamber for the at least one build material removal unit to remove the build material removal volume;
      wherein the build material removal device is adapted to generate at least one primary build material removal stream, the at least one primary build removal stream being a cyclone stream conveyed radially inside the build material removal chamber; and
      wherein the build material removal device is adapted to generate at least one secondary build material removal stream, the at least one secondary build material removal stream is guided through at least one opening arranged in a build material removal chamber wall, and the at least one secondary build material removal stream being guided toward a surface of the at least one three-dimensional object and movable with respect to the at least one three-dimensional object.

2. The apparatus of claim 1, further comprising a moving unit adapted to successively move a powder bed into the build material removal chamber.

3. The apparatus of claim 1, wherein the build material removal chamber is expandable.

4. The apparatus of claim 1, wherein a size of at least one wall portion of the build material removal chamber is adjustable.

5. The apparatus of claim 4, wherein the at least one wall portion comprises a telescopic portion.

6. The apparatus of claim 1, wherein the build material removal device is separate from the process chamber of the apparatus.

7. The apparatus of claim 1, wherein the build material removal device is integrated in the process chamber of the apparatus.

8. The apparatus of claim 1, wherein a shape of the build material removal chamber is adjustable.

9. The apparatus of claim 1, wherein the at least one primary build material removal stream is guided towards a bottom of the build material removal chamber.

10. The apparatus of claim 1, wherein the at least one primary build material removal stream coveys the non-consolidated build material towards at least one wall portion of the at least one build material removal chamber.

11. The apparatus of claim 1, wherein the at least one secondary build material removal stream is guided via the at least one opening into and/or out of the build material removal chamber.

12. The apparatus of claim 11, wherein a position, direction and/or geometry of the at least one opening is defined dependent on the at least one three-dimensional object.

13. The apparatus of claim 11, wherein the at least one secondary build material removal stream is moveable in a swivel movement.

14. A method for additively manufacturing at least one three-dimensional object, the method comprising:
- selectively consolidating layers of a build material to for the at least one three-dimensional object;
- successively moving the at least one three-dimensional object into a build material removal chamber; and,
- removing a build material removal volume of non-consolidated build material surrounding the at least one three-dimensional object via a build material removal device;
- wherein the build material removal device is adapted to generate at least one primary build material removal stream, the at least one primary build removal stream being a cyclone stream conveyed radially inside the build material removal chamber; and
- wherein the build material removal device is adapted to generate at least one secondary build material removal stream, the at least one secondary build material removal stream is guided through at least one opening arranged in a build material removal chamber wall, and the at least one secondary build material removal stream being guided toward a surface of the at least one three-dimensional object and movable with respect to the at least one three-dimensional object.

15. The method of claim 14, wherein the build material removal chamber is expandable.

16. The method of claim 14, wherein the build material removal device is separate from a process chamber of the apparatus.

17. The method of claim 14, wherein the build material removal device is integrated in a process chamber of the apparatus.

18. The method of claim 14, wherein the at least one primary build material removal stream is guided towards a bottom of the build material removal chamber.

19. The method of claim 14, wherein the at least one primary build material removal stream conveys the non-consolidated build material towards at least one wall portion of the build material removal chamber.

20. The method of claim 14, wherein the at least one primary build material removal stream guides a process gas into and/or out of the build material removal chamber.

* * * * *